(12) United States Patent
Kim

(10) Patent No.: US 7,406,097 B2
(45) Date of Patent: Jul. 29, 2008

(54) APPARATUS AND METHOD FOR ACCOMPLISHING HANDOFF BETWEEN MOBILE COMMUNICATION SYSTEMS OF DIFFERENT GENERATIONS

(75) Inventor: Hye Ock Kim, Gunpo-si (KR)

(73) Assignee: LG-Nortel Co., Ltd., Seoul (KR)

( * ) Notice: Subject to any disclaimer, the term of this patent is extended or adjusted under 35 U.S.C. 154(b) by 993 days.

(21) Appl. No.: 10/329,541

(22) Filed: Dec. 27, 2002

(65) Prior Publication Data

US 2003/0129981 A1    Jul. 10, 2003

(30) Foreign Application Priority Data

Dec. 28, 2001    (KR) ................. 2001-87369

(51) Int. Cl.
*H04J 3/22*    (2006.01)
(52) U.S. Cl. .................................. 370/466; 370/401
(58) Field of Classification Search ............... None
See application file for complete search history.

(56) References Cited

U.S. PATENT DOCUMENTS

| | | | | |
|---|---|---|---|---|
| 5,826,188 | A * | 10/1998 | Tayloe et al. ............ | 455/428 |
| 6,567,666 | B2 * | 5/2003 | Czaja et al. ............. | 455/442 |
| 6,647,264 | B1 * | 11/2003 | Sasamoto ................ | 455/445 |
| 6,876,747 | B1 * | 4/2005 | Faccin et al. ............ | 380/247 |
| 6,901,542 | B2 * | 5/2005 | Bartenstein et al. ....... | 714/719 |
| 7,167,475 | B2 * | 1/2007 | Tourunen et al. .......... | 370/394 |
| 2001/0031635 | A1 * | 10/2001 | Bharatia ................. | 455/432 |
| 2002/0078196 | A1 * | 6/2002 | Kim et al. .............. | 709/224 |
| 2003/0027595 | A1 * | 2/2003 | Ejzak ................... | 455/560 |
| 2003/0054823 | A1 * | 3/2003 | Choi et al. .............. | 455/436 |

* cited by examiner

*Primary Examiner*—Brian D Nguyen
(74) *Attorney, Agent, or Firm*—Ked & Associates, LLP

(57) ABSTRACT

A method for accomplishing a handoff between mobile communication systems includes: a first mobile communication system having means for matching elements of a low generation mobile communication system; a second mobile communication system having means for matching elements of a high generation mobile communication system; a gateway connected with each of the mobile communication systems and having means for performing protocol conversion and address mapping. The method includes: adding, to each mobile communication system for which the handoff is performed, at least a message and a handoff process in a target system; transmitting, at the low mobile communication system for receiving a handoff request from a mobile station, a handoff request message to the gateway by performing the message process; transmitting, at the gateway, to the second mobile communication system by performing at least a different address mapping and a protocol conversion between the mobile communication systems in order to transmit and receive at least a signaling message and a traffic data between the mobile communication systems; and assigning, at the high mobile communication system, the message process and a relevant channel.

22 Claims, 11 Drawing Sheets

APPARATUS AND METHOD FOR ACCOMPLISHING HANDOFF BETWEEN MOBILE COMMUNICATION SYSTEMS OF DIFFERENT GENERATIONS

BACKGROUND OF THE INVENTION

1. Field of the Invention

The present invention relates to a handoff of a mobile communication system, and particularly to an apparatus and a method for accomplishing a soft handoff between mobile communication systems of different generations using a gateway

2. Background of the Related Art

The elements for mobile communication system could be roughly divided into a base station and a mobile station. The base station is divided into a base transceiver station (referred to BTS hereinafter) for performing wireless connection among the mobile stations, a base station controller (referred to BSC hereinafter) for controlling a plurality of the BTSs and performing call mobility management related to a call process.

Also, the mobile communication system could include a mobile switching center (referred to MSC hereinafter) that is responsible for a transmission and reception path for data and control signals to and from another communication network, and a base station manager responsible for operation and maintenance of the whole mobile communication system.

The communication between the mobile station and the base station/controller is performed in accordance with the standard IS-2000, while the communication between the base station/controller and the switching center is performed in accordance with the standard 3G-IOS.

CDMA (Code Division Multiple Access) mobile communication systems have developed on the basis of the standard 2G system such as the standard IS-95 mainly intended for transmission and reception of voice signal, and have been developed in accordance with the standard 3G such as the standard IMT-2000 (International Mobile Telecommunications-2000) where transmission of data in high and ultra high speed as well as voice signal is possible.

However, there is no international standard defined for accomplishing a handoff between the 2G system (referred to low generation system hereinafter) and the 3G system (referred to high generation system hereinafter). Therefore, a method for providing service between the high generation system and the low generation system currently in service, without interruption, is required.

Recently, a soft handoff between the MSCs using a router was realized and provided, which is similar to the soft handoff between the BSCs. In this system, the router performs routing of a signaling message, a traffic message, etc. necessary for the soft handoff between each MSC for the soft handoff to a processor of the system in the target side.

As mentioned above, presently there is no international standard defined for accomplishing a handoff between the low generation system and the high generation system, and the low generation system and the high generation system are different in their backbone, so that a soft handoff between systems of different generations could not be realized using the router currently in use.

In order for the variety of messages necessary for the soft handoff to be transmitted and received between two systems, protocol conversion and paths for a signaling message between the systems and a traffic message should be provided.

The above references are incorporated by reference herein where appropriate for appropriate teachings of additional or alternative details, features and/or technical background.

SUMMARY OF THE INVENTION

One embodiment of the invention solves at least the above problems and/or disadvantages and provides at least the advantages described hereinafter.

Accordingly, one embodiment of the present invention solves the foregoing problems by providing a method for accomplishing a handoff between communication systems of different generations using a gateway for performing protocol conversion and address mapping in a mobile communication system.

In order for a signaling message and traffic data to be transmitted and received between two systems of different generations, the gateway connecting the two systems transmits information by performing an addressing mapping and a protocol conversion in conformity with each target system.

Also, in order to perform a handoff between communication systems of different generations, one embodiment of the present invention forms message information by adding, to each mobile communication system for which handoff is performed, at least one procedure from a message and a handoff process in the target system, transmitting the same to the gateway.

The foregoing and other advantages may be realized by providing a method for accomplishing handoff between mobile communication systems including: a first mobile communication system having means for matching elements of a low generation mobile communication system; a second mobile communication system having means for matching elements of a high generation mobile communication system; a gateway connected with each of the mobile communication systems, having means for performing protocol conversion and address mapping, the method including: adding, to each mobile communication system for which the handoff is performed, at least a message and a handoff process in a target system; transmitting, at the low mobile communication system for receiving a handoff request from a mobile station, a handoff request message to the gateway by performing the message process; transmitting, at the gateway, to the second mobile communication system by performing at least a different address mapping and a protocol conversion between the mobile communication systems in order to transmit and receive at least a signaling message and traffic data between the mobile communication systems; and assigning, at the high mobile communication system, the message process and a relevant channel.

Accordingly, a message conversion is performed and a soft handoff between communication systems of different generations is performed with the use of the gateway for performing address mapping and protocol conversion in the mobile communication systems between different generations.

Additional advantages and features of the invention will be set forth in part in the description which follows and in part will become apparent to those having ordinary skill in the art upon examination of the following or may be learned from practice of the invention. The advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The following detailed description will present an apparatus and method for serving a handoff between different mobile communication systems according to preferred embodiments of the invention in reference to the accompanying drawings.

One embodiment of the present invention interfaces a 2G system with a 3G system using the gateway. This allows discrimination from interfacing that results when using the router of conventional systems mentioned above, and improves performance through minimization in a gateway load by having only address mapping and protocol conversion performed at the gateway.

Figure 1:
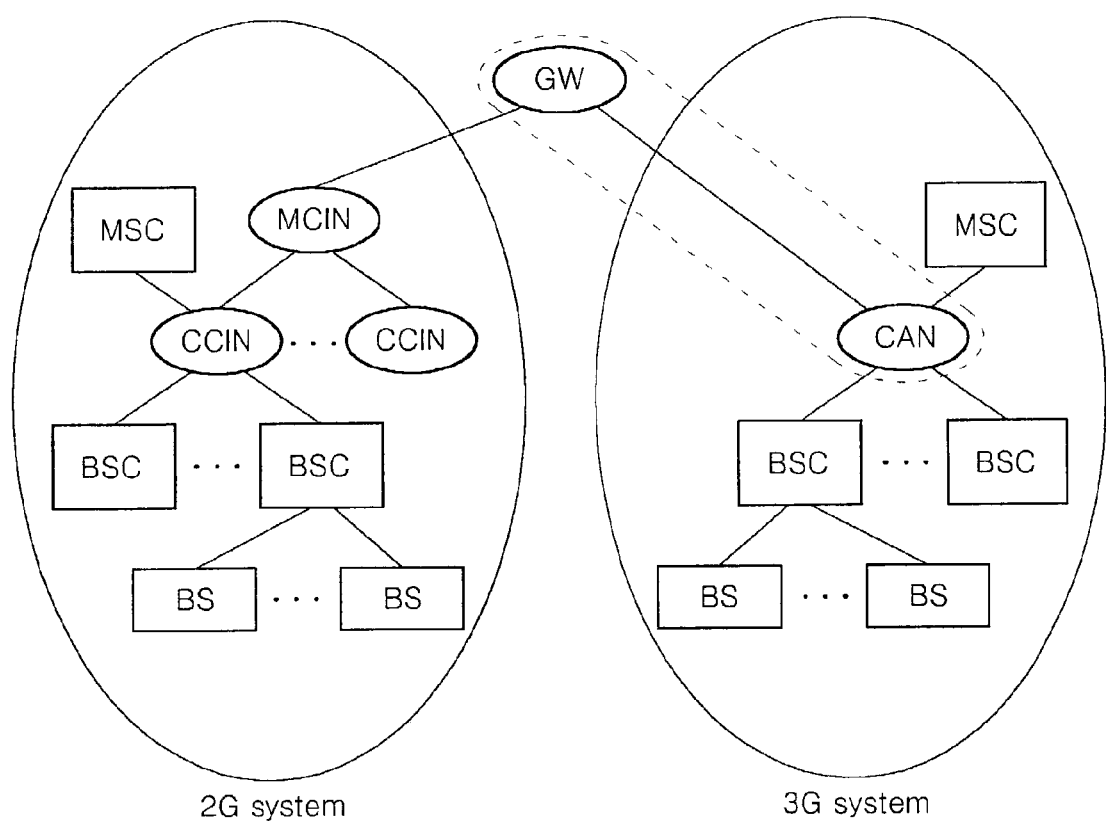
FIG. 1 is a view illustrating construction where a gateway connects mobile communication systems of different generations in accordance with one embodiment of the present invention.

FIG. 1 is a view illustrating a construction where a gateway connects mobile communication systems of different generation in accordance with one embodiment of the present invention.

As shown in FIG. 1, the construction includes a low generation mobile communication system including a CCIN (Central CDMA Inter Networking Block) network for connecting a BSC in the 2G low generation communication system; a high generation mobile communication system including CAN (Central ATM(Asynchronous Transfer Mode) Switch Network) for matching elements of a 3G high generation communication system; and a gateway including an ALIA (ATM-to-Packet, Packet-to-ATM Line Interface Board Assembly) connected with each of the mobile communication systems for processing protocol conversion and/or address mapping, an APPA (ATM-to-Packet Packet-to-ATM Conversion Board Assembly), and a GNP (Gateway Network Processor).

Also, in FIG. 1, a MCIN (Metropolitan CDMA Inter Networking Block) for matching the CCIN, could be included.

In this embodiment, the CCIN acts as a network for connecting BSC in the low generation communication system, the ALIA is a board connected with a CITA (CDMA Internetworking & Trunk Board Assembly) of the low generation communication system in the gateway, and the APPA is a board responsible for protocol conversion and address mapping in the gateway. Also, the CITA is a board responsible for trunk connection in the network of the low generation communication system.

Figure 2:
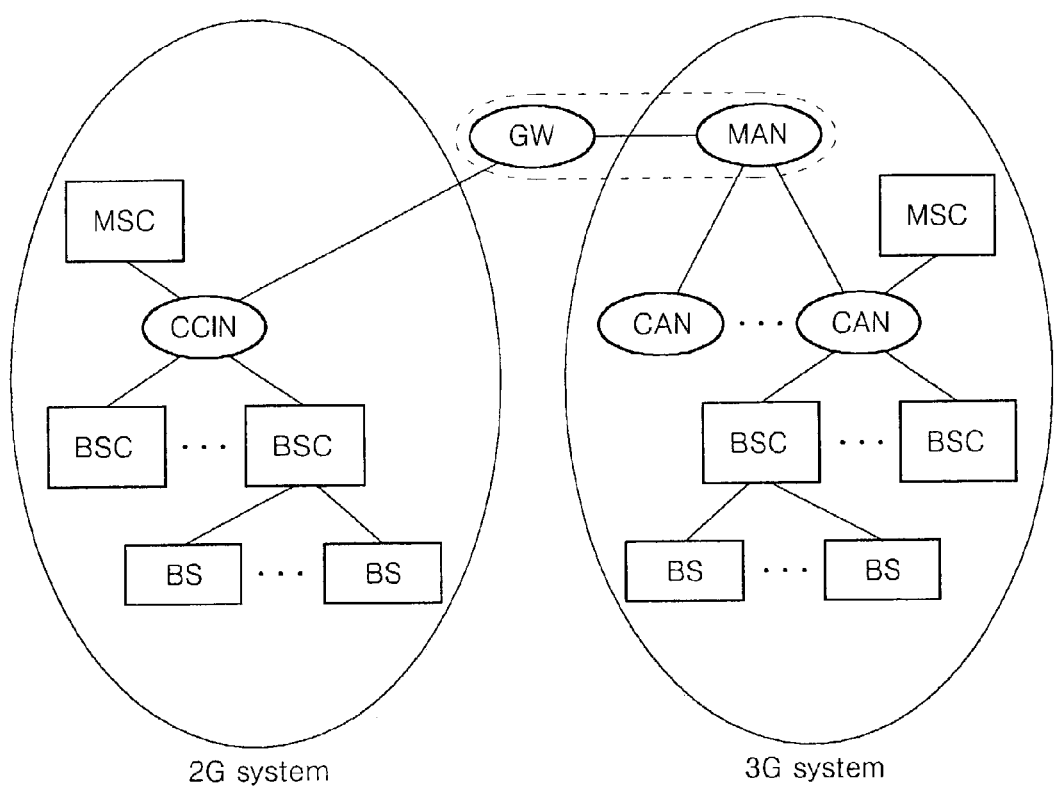
FIG. 2 is a view illustrating construction where a gateway connects mobile communication systems of different generations in accordance with another embodiment of the present invention.

FIG. 2 is a view illustrating a construction where a gateway connects mobile communication systems of different generations in accordance with another embodiment of the present invention.

As shown in FIG. 2, the construction consists of a low generation mobile communication system including a CCIN for matching elements of the 2G low generation communication system; a high generation mobile communication system including a CAN for matching elements of 3G high generation communication system and possibly a MAN (Metropolitan ATM Network) for matching the CAN; and a gateway including an ALIA connected with each of the mobile communication systems for processing protocol conversion and/or address mapping, an APPA, and a GNP.

In this embodiment, the MAN acts as a network for connecting the CAN in the high generation communication system. Also, in FIG. 2, a MCIN for matching the CCIN could be included. Also in FIG. 2, a MAN for matching the gateway and elements of the high generation communication system could be formed in one block.

Figure 3:
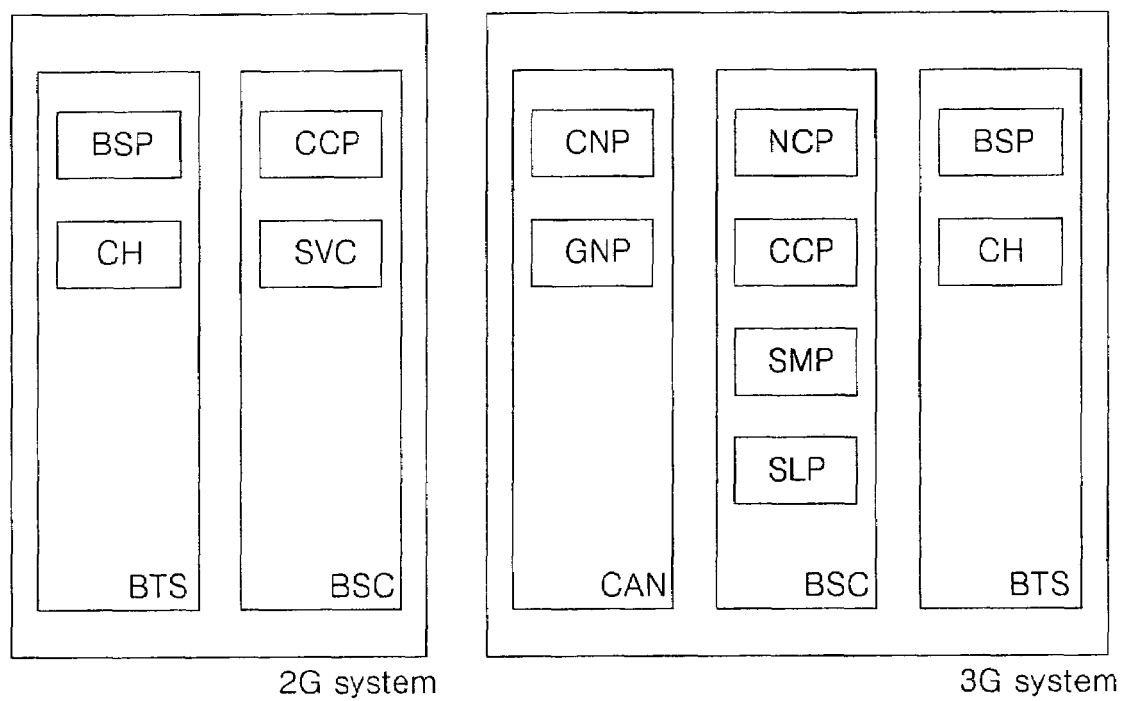
FIG. 3 is a view illustrating blocks an algorithm for performing a message process or a handoff process, and an algorithm for performing address mapping between systems according to one embodiment of the invention.

FIG. 3 is a view illustrating blocks of an algorithm for performing, at each mobile communication system, a message process or a handoff process, and an algorithm for performing, at gateway, address mapping between systems.

According to one embodiment, a function for performing the handoff between the low and high communication systems can be added to the low/high generation communication software block. This new software block can be installed on each of the mobile communication systems.

In FIG. 3, a BSP (Base Station Processor) acts as a main processor of the base station, CH indicates a channel, a CCP (Call Control Processor) acts as a main processor of the controller, a SVC (Switched Virtual Connection) and a SLP (Service Location Protocol) act as a selector, respectively, a NCP acts as a network controller processor, a GNP acts as a main processor of the gateway. Also, a SMP (Selector Master Processor) can act as a master processor of selectors in the high generation system.

As shown in FIG. 3, the gateway could be formed within the CAN or the MAN of the high generation communication system, and is possibly configured by other apparatus different from those shown in FIG. 3.

Figure 4:
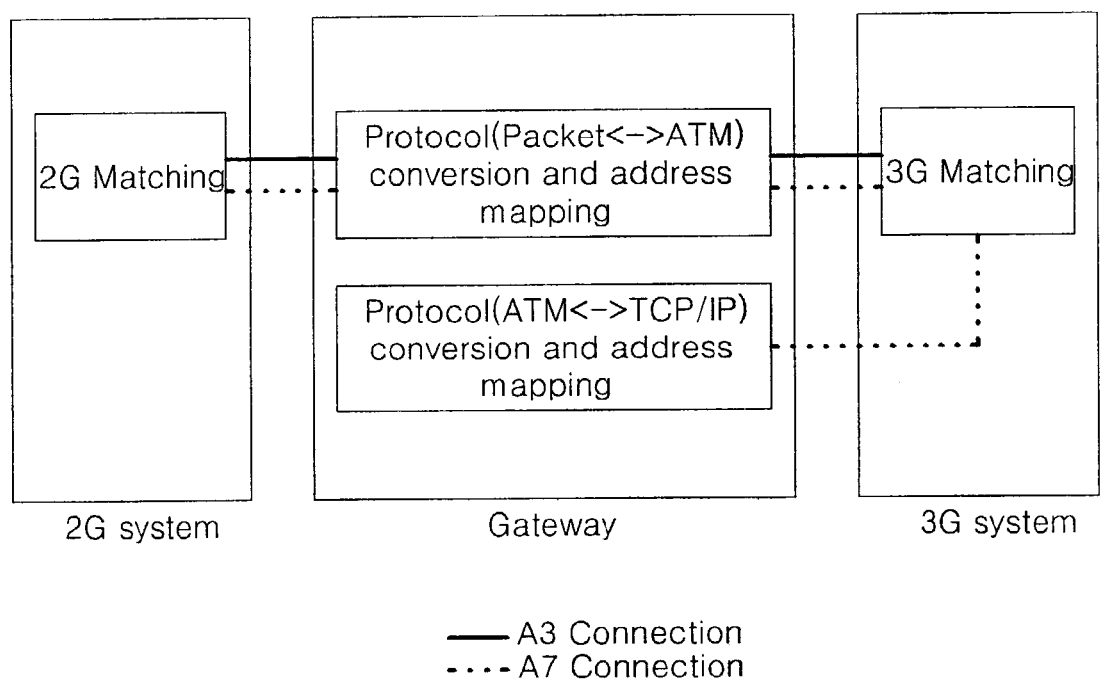
FIG. 4 is a view illustrating a gateway for performing protocol conversion and address mapping according to one embodiment of the present invention.

FIG. 4 is a view illustrating one embodiment of a gateway for performing protocol conversion and address mapping according to the present invention. As shown in FIG. 4, the gateway performs protocol conversion from the low generation to the high generation (specifically, from IPC packet to ATM) and address mapping, while also performing, reverses, protocol conversion from the high generation to the low generation (specifically, from ATM to IPC packet) and address mapping. In the case of an A7 signaling message, additional protocol conversion (ATM☐TCP (Transmission Control Protocol)/IP (Internet Protocol)) and address mapping are performed.

Also, A3 and A7 connections are shown, in which A3 stands for interfaces of traffic information (voice and data) and signaling information between a SDU (Service Data Unit) for providing a data service and a channel, and A7 stands for an interface of signaling information between a source base station and a target base station.

Generally, a message can be divided into a traffic message and a signaling message, and the signaling message can mean all signaling messages including signaling related to a handoff such as a handoff request, a handoff channel assignment response message, etc.

In general, to accomplish a soft handoff between communication systems of different generation, communication between an air traffic channel element (ex. a channel element provided in the low generation system) and a selector (ex. a selector provided in the high generation system) of each communication system should be achieved.

Also, in the case of transmitting an IPC packet or ATM cell between different communication systems, a target address and a protocol for message transmission and reception, can be converted between the low generation system and the high generation system having an ATM network for its backbone; and a signaling and a traffic message for the relevant target address can be delivered or routed.

Thus, the gateway may be an end terminal for signaling and traffic messages transmitted from the high generation system having an ATM for its backbone. The gateway can also be an end terminal for signaling and traffic messages transmitted from the low generation system. Also, the gateway can transmit a message to the relevant target by performing protocol conversion and address mapping for the message between communication systems of different generations.

Figure 5:
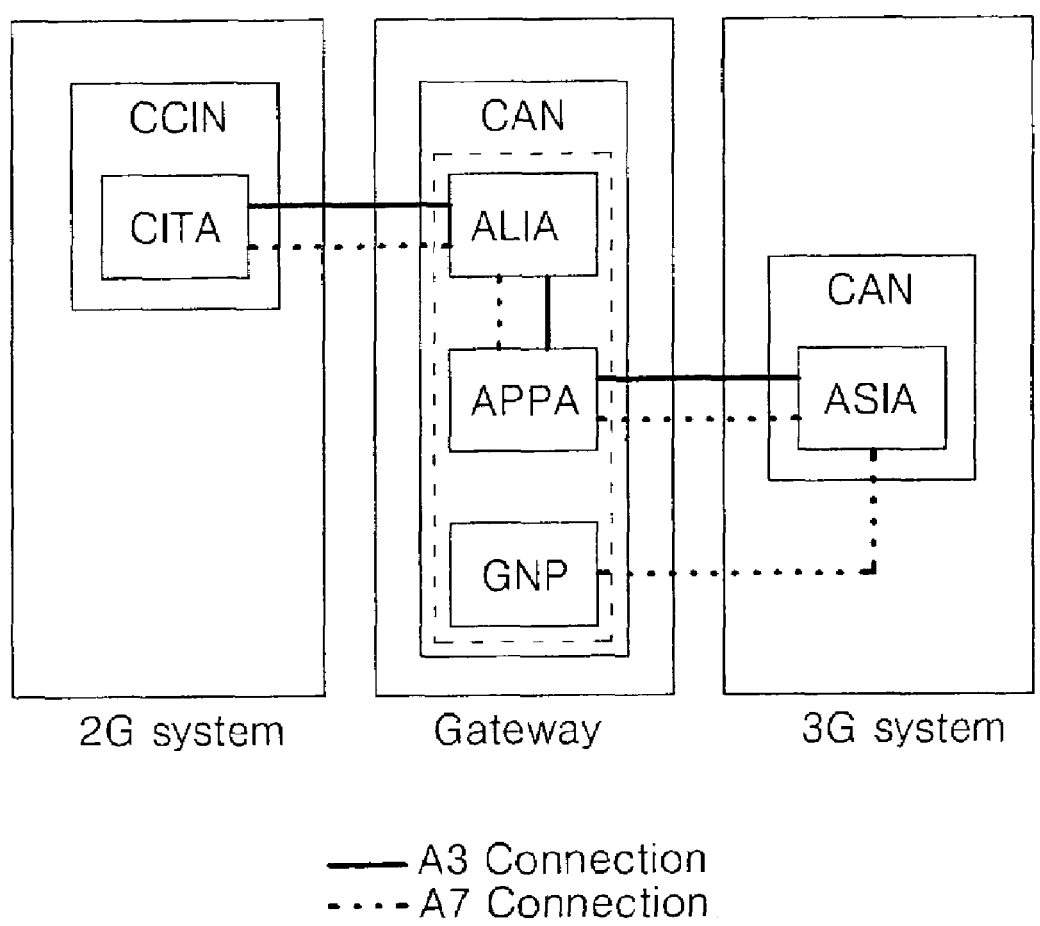
FIG. 5 is a view illustrating construction of the gateway and the different mobile communication systems of FIG. 4.

FIG. 5 is a view illustrating one embodiment of a construction of the gateway of FIG. 4. In FIG. 5, A3 and A7 connections are shown. Each element of the system shown in FIG. 5 may operate in the same manner upon the A3 and A7 connections.

The CITA performs matching with elements of the low generation system of FIG. 1 and FIG. 2, and the ALIA performs line interfacing with the CITA element of the low generation system and communication with the main processor (GNP).

Also, the APPA of the gateway performs a conversion between an ATM and an IPC packet, an ATM connection/IPC address conversion between different generations, a communication with the main processor (GNP). More specifically, if a handoff is performed from the high generation to the low generation, the APPA performs a conversion of an AAL5 protocol of the ATM application layer into an IPC packet, and/or performs address mapping. Also, if a handoff is performed from the low generation to the high generation, the APPA performs a conversion of an IPC packet into an AAL5 protocol of the ATM application layer, and/or performs address mapping.

The GNP (Gateway Network Processor) may be a main processor and performs at least one function among a protocol conversion of A7 signaling, an A3 connection setup/release (SVC connection) between the different generations, and a communication with a sub device (ALIA, APPA) through a local communication channel). The GNP of the gateway may perform a function of a mutual exchange of TCP/IP protocols with an AAL5 of the ATM application layer, and/or an address mapping for an A7 signaling message.

Also, an ASIA (ATM STM-1 Interface board Assembly) may perform matching with elements of the high generation system shown in FIG. 1 and FIG. 2. More specifically, the ASIA may be a board responsible for ATM STM-1 interface in the high generation communication system. In the foregoing, A3 is mutually connected with CITA, ALIA, APPA, ASIA, and A7 is mutually connected with CITA, ALIA, APPA, ASIA, GNP, ASIA.

Figure 6:
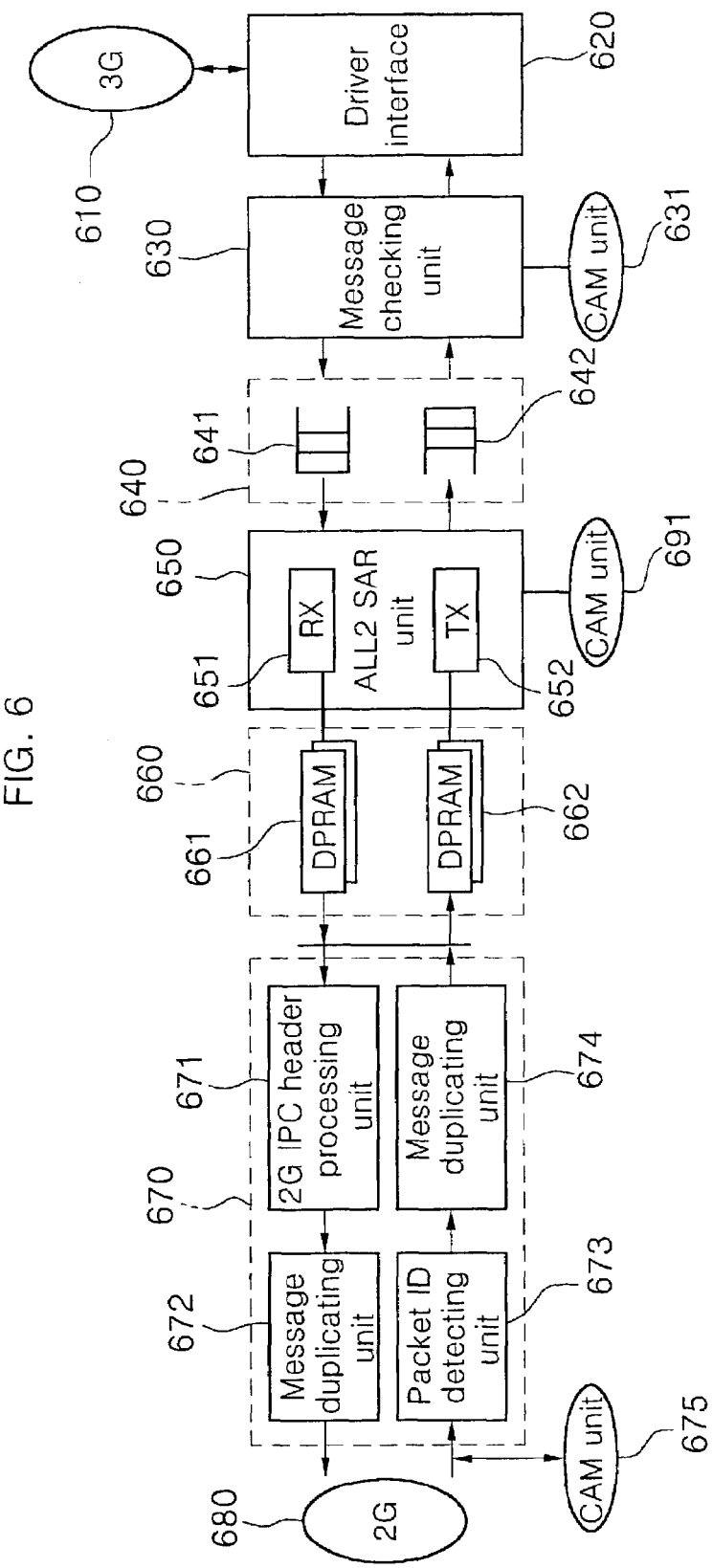
FIG. 6 is a block diagram illustrating an APPA construction in the gateway construction.

FIG. 6 is a block diagram illustrating an APPA construction according to one embodiment.

According to one embodiment, the APPA has a construction which includes a driver interface 620 for giving and taking a message to and from the high generation system 610; a message checking unit 630 for determining A3/A7 by analyzing header information of an AAL2 message delivered from the driver interface 620, and for detecting a target address using a CAM unit 631; a first in-first out memory 640; 641, 642 for transmitting and receiving an AAL message; an AAL2 SAR (Segmentation and reassembly sublayer) 650 for disassembling and assembling an AAL2 message to and from an ATM cell; a memory unit (DPRAM) 660; 661, 662 for storing a message provided from the AAL2 SAR unit 650; a message converting unit 670 for mutually converting a message between the AAL2SAR unit 650 and the low generation system 680.

According to one embodiment, the message converting unit 670 includes: a first message converting unit consisting of: IPC header processor 671 for inserting the target address and packet identifier in order to convert an AAL2 message of the high generation system into an A3 message of the low generation system, and for filling header information with a value obtained by subtraction of two bytes from a payload of the AAL2; a message duplicating unit 672 for making an A3 message by duplicating actual payload data except signal identifier information of the AAL2 to the processed IPC header information, delivering the A3 message to the low generation system; and a second message converting unit consisting of: a packet identifier detecting unit 673 for taking only an A3 message by detecting a packet identifier (ID) of a message delivered to the low generation system, and discriminating whether the message is A3 or A7, and for obtaining a VPI/VCI (Virtual Path Identifier/Virtual Channel Identifier) of an AAL2 using a target address of an A3 message by referring a second CAM unit 675 in the case of converting a message (A3) of the low generation system into a message (AAL2) of the high generation system; a message duplicating unit 674 for making an AAL2 message by duplicating a value obtained by subtraction of two bytes from header information including the VPI/VCI and length information of an IPC header, to the payload of AAL2, and by performing duplication from the signal identifier to the end point.

Also, a first and a second CAM units 631 and 675 may be configured such that a target address of an A3 message and a VPI/VCI are mutually mapped and stored in the form of a table.

Figure 7:
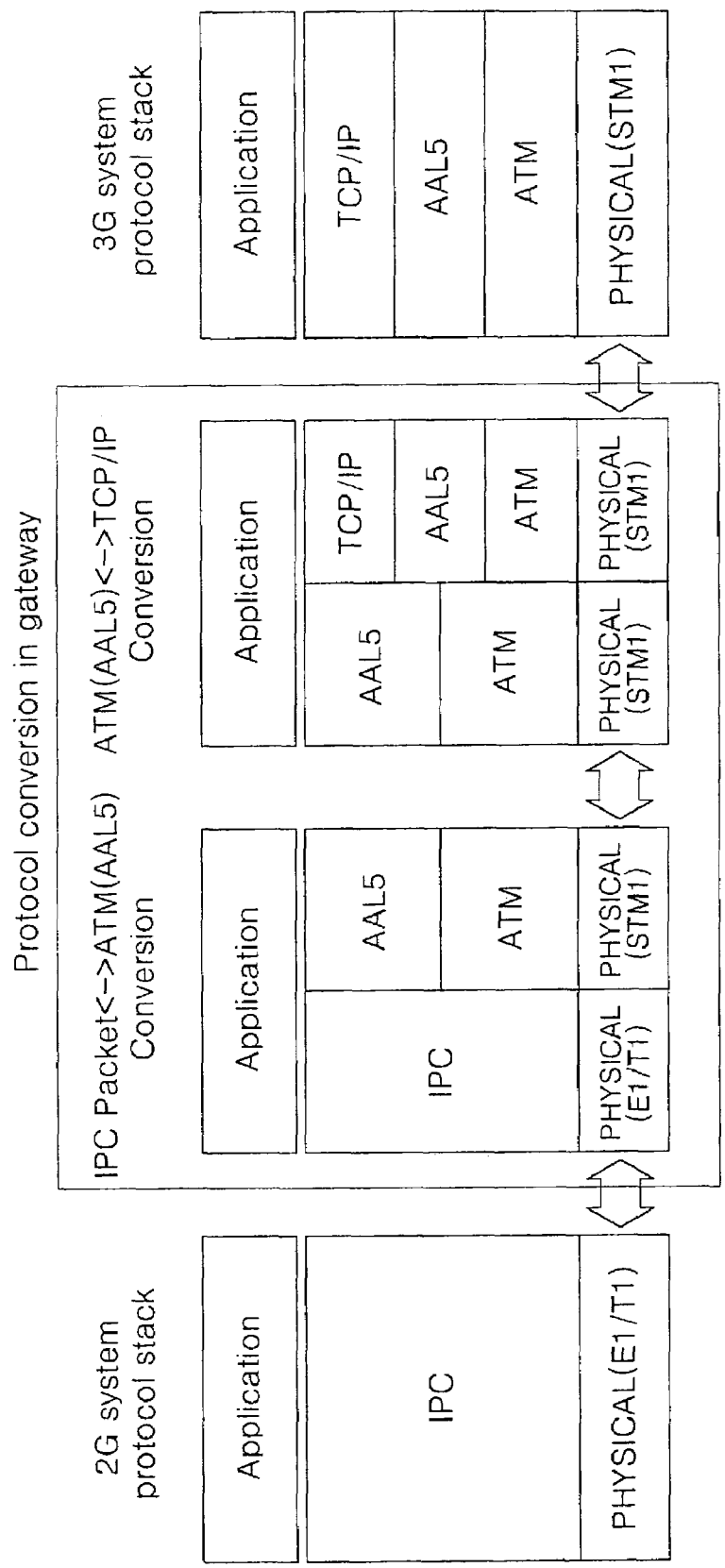
FIG. 7 is a view illustrating protocol conversion of an A7 signal in low and high generation communication systems and a gateway.

FIG. 7 is a view illustrating one embodiment of a mutual conversion of protocols for an A7 signal in low and high generation communication systems and a gateway.

As shown in FIG. 7, a protocol layer structure of the high generation communication system may consist of a physical layer STM1, an ATM layer, an AAL5 layer, a TCP/IP layer and an application layer. A protocol layer structure of the low generation communication system may consist of a physical layer E1/T1, an IPC (Inter Processor Communication) layer and an application layer.

A protocol conversion layer structure of the gateway may consist of a physical layer E1/T1/STM1, an IPC layer, an ATM layer, an AAL5 layer, a TCP/IP layer and an application layer. The application layer converts a TCP/IP message transferred from the high generation system into an ATM cell. After that, the application layer converts the ATM cell into an IPC protocol appropriate for the low generation system.

The application layer converts an IPC packet transferred from the low generation system into an ATM cell, and again converting the ATM cell into a TCP/IP message appropriate for the high generation system.

The protocol conversion at the gateway according to one embodiment of the present invention converts header information, except source data with respect to an IPC packet directed to target mobile communication system, so that the header information may be appropriate for the target system.

The application layer sets a SVC for an A3 connection using information (source data information) within the relevant message upon conversion of a TCP/IP message into an ATM cell or conversion of an ATM cell into a TCP/IP message.

The set SVC information for the A3 connection is delivered to a sub device of the gateway and is used upon an address mapping of the A3 signal and traffic data. Also, the application layer performs address mapping by obtaining address information of the target system using the information (source data information) within the relevant message and performs a transmission of a message to the target system.

Figure 8:
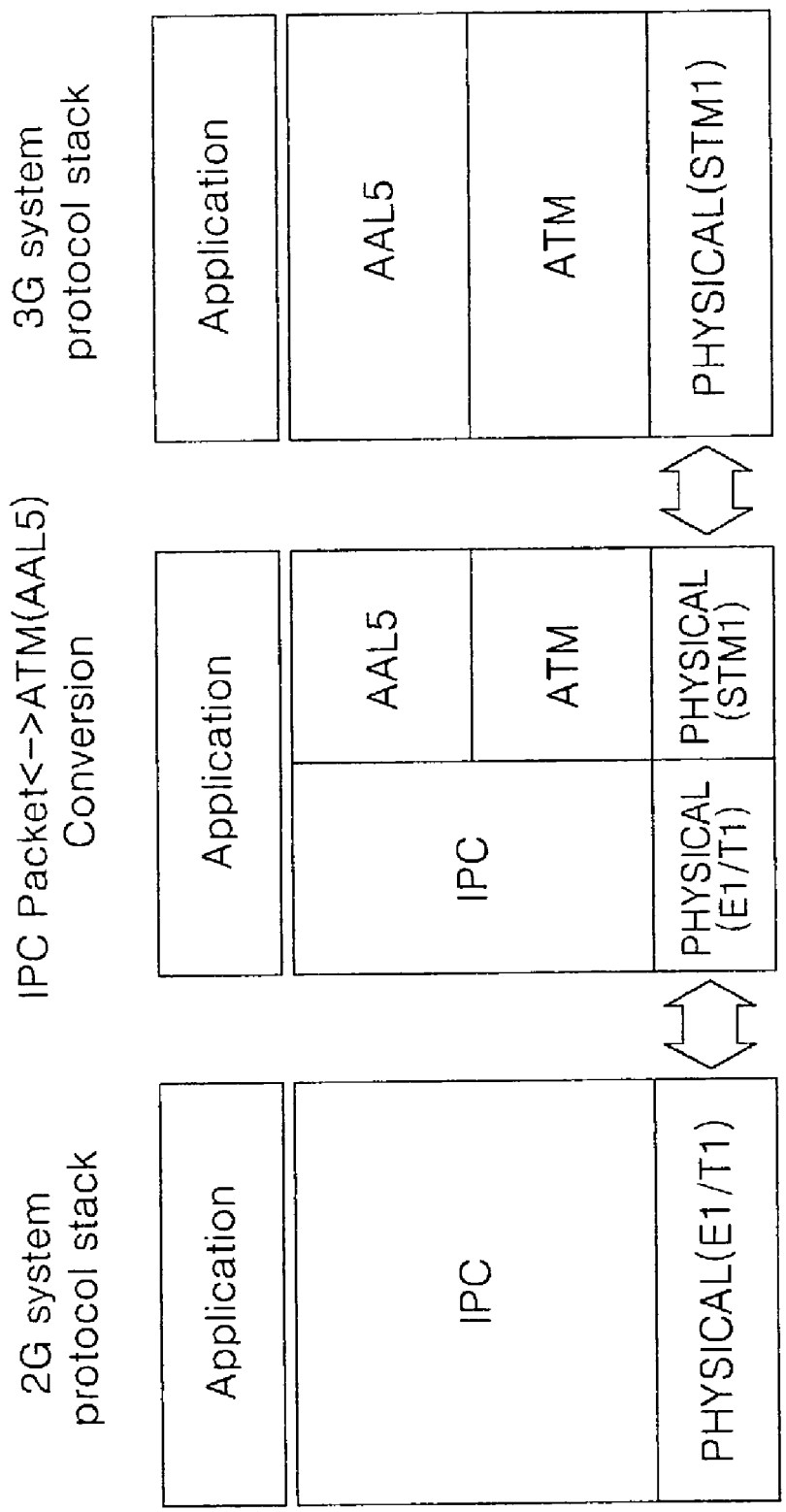
FIG. 8 is a view illustrating protocol conversion of an A3 signal and traffic data in low and high generation communication systems and a gateway.

FIG. 8 is a view illustrating one embodiment of a mutual conversion of protocols for an A3 signal and traffic data in low and high generation communication systems and a gateway. The protocol layer structure of FIG. 8 may be the same as the protocol layer of FIG. 7. An application layer converts an ATM cell transferred from the high generation system into an IPC protocol appropriate for the low generation system. Also, the application layer converts an IPC packet transferred from the low generation system into an ATM cell appropriate for the high generation system. The application layer performs address mapping using assigned SVC information of an A3 connection, transmitting a signal and a traffic message to the target system.

In one embodiment, an A7 signaling message construction for performing a handoff between mobile communication systems of different generations using a message processing algorithm provided to each mobile communication system is as follows:

A data frame which goes through a message process at the low generation system and is transmitted to the gateway, consists of an IPC header and IPC data. The IPC header includes a signal ID, a source address, a target address, a source task ID, a target task ID that would be transmitted, and the IPC data includes a source address, a target address, a source task ID, and a target task ID.

The gateway has a mapping table for a signaling message of the low/high generation and performs an address mapping process so that the signaling message is to be transmitted to the relevant target system.

In the case of a transmission to the high generation system from the gateway, the data frame goes through a message process at the mobile communication system of the low generation and is transmitted to the mobile communication system of the high generation from the gateway. The data frame consists of an IP header and IP data, where the IP header includes a target address, a target task ID, and the IP data includes a source address, a target address, a source task ID, and a target task ID.

The opposite case, namely, data transmission from the high generation to the low generation, will be described in the following.

A data frame transmitted to the gateway from the high generation system after going through message processing at the high generation system consists of an IP header and IP data, where the IP header includes a signal ID, a source address, a target address, a source task ID, a target task ID that would be transmitted, and the IP data includes a source address, a target address, a source task ID, and a target task ID that would be transmitted.

The data frame which is transmitted to the low generation system from the gateway consists of an IPC header and IPC data, where the IPC header includes a signal ID, a source address, a target address, a source task ID, a target task ID that would be transmitted, and the IPC data includes a target address and target task ID.

Based on the information transmitted, the relevant data is delivered to addresses of the different generation systems, whereby a handoff is performed.

Figure 9:
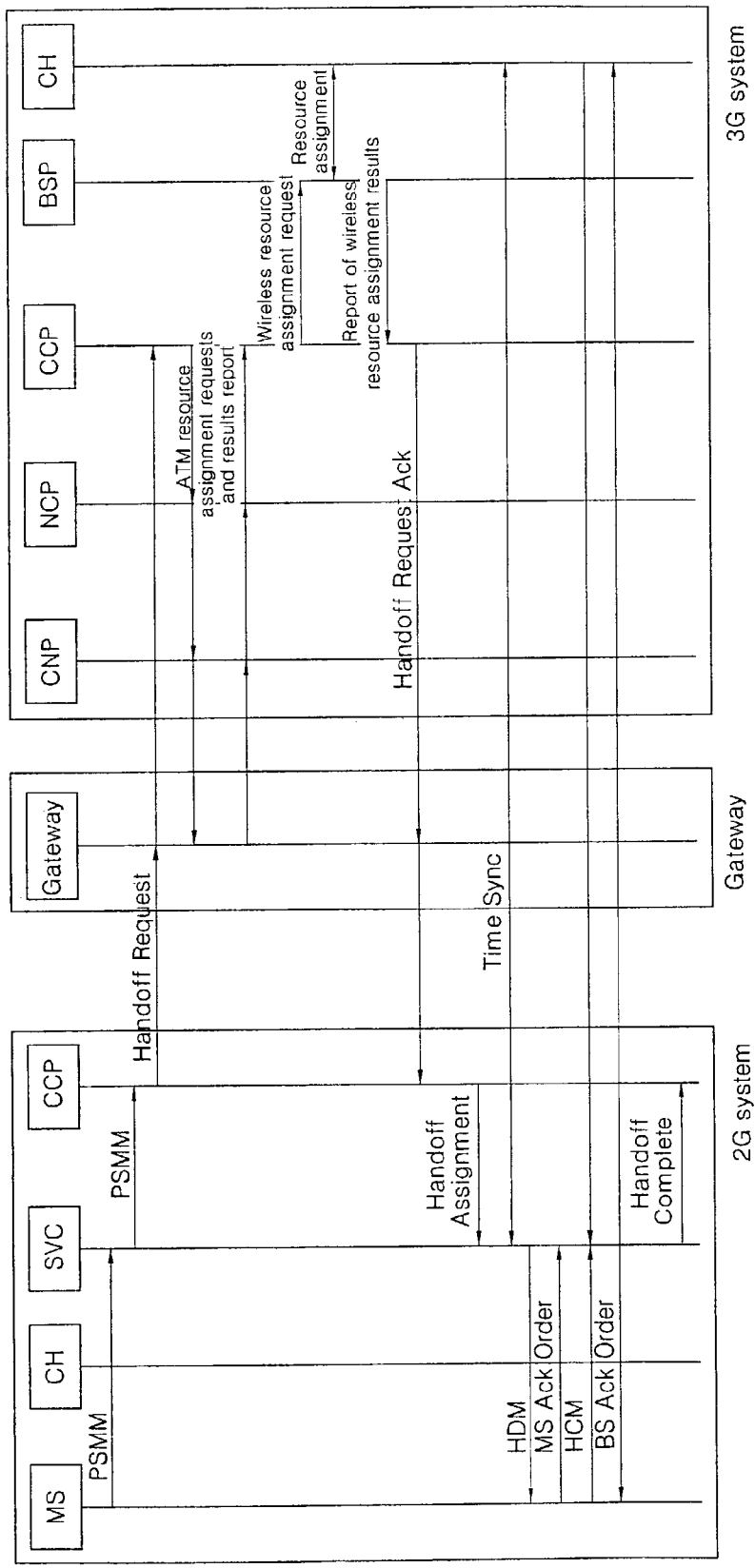
FIG. 9 is a view illustrating a handoff flow from a 2G low generation to a 3G high generation system through the gateway.

FIG. 9 is a view illustrating a handoff flow from a 2G to a 3G through the gateway. A terminal (mobile station) whose call is in progress at the low generation system, transmits a PSMM (Pilot Strength Measurement Message) to a SVC The SVC reports the PSMM information received from the terminal to a CCP and the CCP detects that it is handoff between BSCs using the reported PSMM information, and target system detects that the target system is the high generation system from configuration information of the relevant base station. The target system transmits a handoff request message to the gateway.

The gateway, given a handoff request message, transmits a handoff request message to a CCP of the high generation system by performing address mapping and protocol conversion. The CCP of the high generation system, given a handoff request message from the gateway, requests an ATM resource assignment of a NCP for accomplishing a handoff resource assignment.

The NCP, given a resource assignment request, detects it is a resource assignment request for accomplishing a handoff between BSCs and requests a resource assignment for accomplishing the handoff between BSCs of a CNP (Central Network Processor). The CNP may be a master processor of a CAN for the high generation system. The CNP, given a resource assignment request, detects it is a resource assignment for accomplishing the handoff between different generation systems and requests a resource assignment of the gateway.

The gateway informs the CNP of the resource assignment results and assigns a resource. Then, the CNP informs the NCP of the resource assignment results and assigned resource, and the NCP informs the CCP of resource assignment results and assigned resource.

The CCP, given the ATM resource assignment results from the NCP, requests a wireless resource assignment of a BSP when an ATM resource assignment is normally made. The BSP, given a wireless resource assignment request, assigns a wireless resource and reports the results to the CCP.

Then, the CCP of the high generation system transmits a handoff request ack message to the gateway.

The gateway, given the handoff request ack message, performs address mapping and protocol conversion and transmits the handoff request ack message to the CCP of the low generation system. The CCP, given the handoff request ack message, informs the SVC of the results and aligns a time synchronization between the SVC and the CH.

The SVC transmits a HDM (Handoff Direction Message) to the terminal and the terminal, given the HDM, transmits a MS ack order and a HCM (Handoff Completion Message) through the CH. Then, the SVC transmits a BS ack order to the terminal and then informs the CCP that the handoff (soft-add) has been performed successfully.

Figure 10:
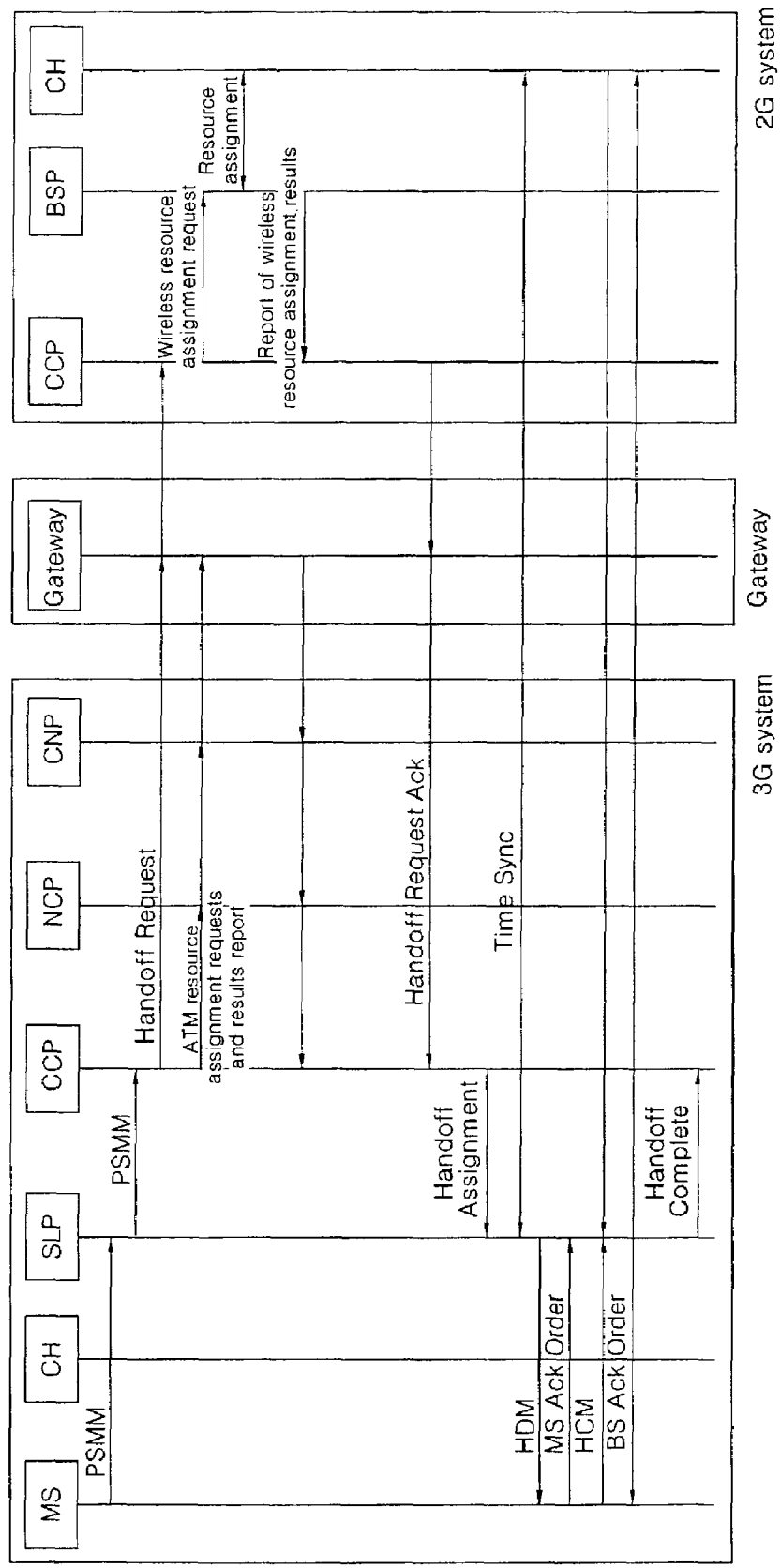
FIG. 10 is a view illustrating a handoff flow from a 3G high generation to a 2G, low generation system through the gateway.

FIG. 10 is a view illustrating a handoff flow from a high generation to a low generation system through the gateway according to one embodiment. If a terminal where a call is in progress at the high generation system transmits a PSMM, SLP reports the PSMM information received from the terminal to a CCP.

The CCP detects that it is a handoff between BSCs using the reported PSMM information, detects that a target system is the low generation system from configuration information of the relevant base station, and transmits a handoff request message to the gateway. The gateway, given the handoff request message, performs address mapping and protocol conversion and transmits the handoff request message to the CCP of the low generation system.

The CCP of the low generation system, given the handoff request message from the gateway, requests a wireless resource assignment of the base station. The BSP, given a wireless resource assignment request, assigns a wireless resource and reports the results to the CCP.

The CCP of the low generation system transmits a handoff request ack message to the gateway. The gateway, given the handoff request ack message, performs address mapping and protocol conversion and transmits the handoff request ack message to the CCP of the high generation system.

In the foregoing procedure, the CCP of the high generation system requests an ATM resource assignment of the NCP for accomplishing a handoff resource assignment. The NCP, given the resource assignment request, detects that it is a resource assignment request for accomplishing a handoff between BSCs and requests a resource assignment for accomplishing the handoff between BSCs of the CNP.

The CNP, given the resource assignment request, detects that it is a resource assignment request for accomplishing the handoff between different generations and requests a resource assignment of the gateway. The gateway informs the CNP of the resource assignment results and assigns the resources.

Then, the CNP informs the NCP of the resource assignment results and assigned resources. The NCP informs the CCP of the resource assignment results and assigned resources.

The CCP of the high generation system, given a handoff request ack message and ATM resource assignment results, informs the SLP of the results and aligns a time synchronization between the SLP and the CH.

The SLP transmits a HDM (Handoff Direction Message) to the terminal. The terminal, given the HDM, transmits an MS ack order and transmits a HCM (Handoff Completion Message) through the CH. The SLP, given the HCM, transmits a BS ack order to the terminal. Accordingly, the SLP informs the CCP that the handoff (soft-add) has been performed successfully.

Figure 11:
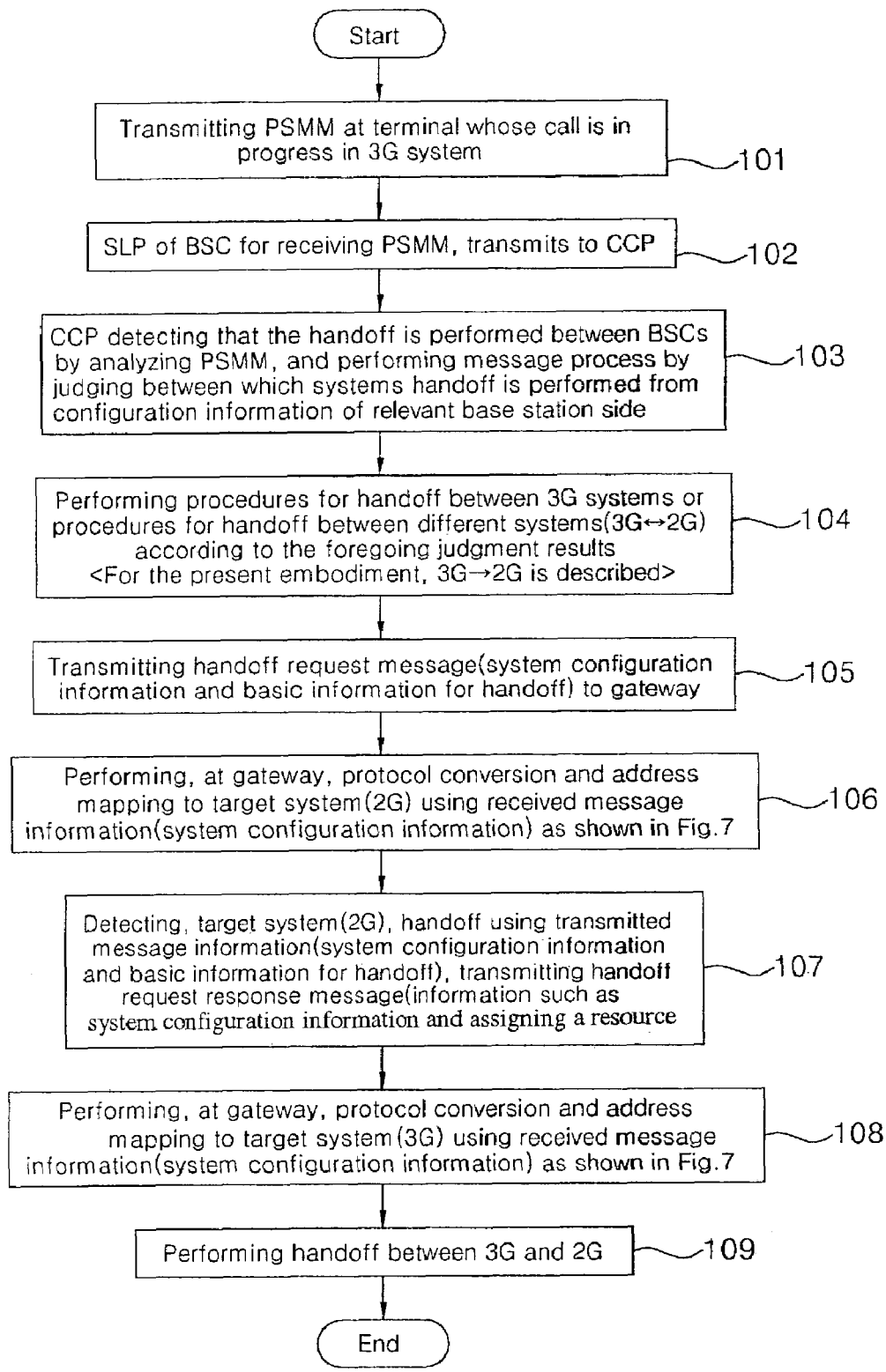
FIG. 11 is a flowchart illustrating an embodiment of a handoff from a 3G high generation to a 2G low generation system.

FIG. 11 is a flowchart illustrating an embodiment of a handoff from a high generation to a low generation system. In the case of the high generation system, the CCP for detecting a handoff between BSCs(inter-BSC handoff) by analyzing a PSMM received from the SLP, determines whether it is a handoff between different generation systems or not by checking a field value that indicates which system the base station belongs to (whether the base station belongs to the low generation system or the high generation system) from configuration information of the relevant base station (101, 102, 103).

The relevant field is given to the CCP through a PLD (Programming Loading Data) and could be changed by an operator.

If the relevant field value means that the base station belongs to the high generation system, then the handoff is performed in accordance with the handoff procedures of the high generation system.

If the relevant field means that the base station belongs to the low generation system, then a handoff request message (system configuration information and basic information for accomplishing a handoff) is transmitted to the gateway (104, 105).

The handoff request message could be roughly divided into two categories, namely, system configuration information and basic information for accomplishing a handoff.

The system configuration information includes: target system configuration information, source system configuration information, and other information; in which the target system configuration information includes MSC information (MSC ID), BSC information (BSC ID, BSC address), BTS information (BTS ID, Sector ID), system information (the low generation system), and task information (task ID) of the low generation system; and the source system configuration information includes MSC information (MSC ID), BSC information (BSC ID, BSC address), system information (the high generation system), task information (task ID) of the high generation system; and other information includes a signal ID of a message. The basic information for accomplishing a handoff may include a pilot strength pn (pseudo noise) and phase information.

The gateway, given a handoff request message, transmits the relevant message to the CCP of the low generation system by performing protocol conversion and address mapping as shown in FIG. 7. The gateway performs address mapping with reference to the field value of the low generation system configuration information (MSC information, BSC/BTS information), configuration information for the target system among system configuration information in the handoff request message, setting of the signal ID of the handoff request message to the signal ID, and other information among the system configuration information (106).

The CCP of the low generation system, given a handoff request message from the gateway, detects that it is handoff request between generations through system information in the message and assigns a wireless resource using handoff basic information in accordance with the handoff procedure for the low generation system. The CCP, which has completed the wireless resource assignment, transmits a handoff request acknowledgement message to the gateway (107).

In the foregoing, the construction of the handoff request acknowledgement message transmitted from the gateway could be roughly divided into system configuration information and basic information for accomplishing a handoff, where the system configuration information is the same as the system configuration information of the handoff request message, but the source system configuration information includes configuration information of the low generation system, and the target system configuration information includes configuration information of the high generation, and the basic information of the handoff includes assigned wireless resource information (TCH ID, Walsh code).

The gateway, given a handoff request acknowledgement message, transmits the relevant message to the CCP of the high generation system by performing protocol conversion and address mapping.

The gateway also performs address mapping with reference to the field value of the configuration information of the high generation system, configuration information of the target system among the system information in the handoff request acknowledgement message, setting of the signal ID of the handoff request acknowledgement message to the signal ID, and other information among the system configuration information (108).

The CCP, given a handoff request acknowledgement message from the gateway, detects that it is an acknowledgement message for the handoff request message of its own through the system configuration information and performs a handoff using the handoff basic information in accordance with handoff procedure of the high generation system (109).

The process of FIG. 11 can also be used for a handoff from the low generation system to the high generation system.

As is apparent from the foregoing, some embodiments of the present invention add a message process and/or handoff procedure of the target system to each of the mobile communication system 1 and 2 for which the handoff would be performed; and perform, at the gateway, address mapping and/or protocol conversion between the mobile communication systems using information received from each of the mobile communication systems in order to transmit and receive the signaling message and the traffic data between the mobile communication systems. Thus transmitting information necessary for accomplishing a handoff to the target mobile communication system so that the handoff is performed between mobile communication systems of different generations.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A system for accomplishing a handoff, comprising:
   a first mobile communication system;
   a second mobile communication system; and
   a gateway, connected with each of the first and second mobile communication systems, to perform a protocol conversion and an address mapping for handing off a call between the first and second mobile communication systems,
   wherein the protocol conversion performed by the gateway includes converting packets of a first type to packets of a second type, with one of said first or second type of packets corresponding to an asynchronous transfer mode (ATM) packet and the other of said first or second type of packets corresponding to an inter processor communication (IPC) packet,
   wherein the address mapping performed by the gateway includes mapping at least one type of message between the first and second mobile communication systems, and
   wherein one or more packets of the first type include a data frame transmitted to the gateway from the first mobile communication system, the data frame comprising an inter processor communication header and inter processor communication data, the inter processor communication data including at least a source address, a target address, a source task identifier (ID), and a target task ID.

2. The system according to claim 1, wherein a gateway network processor performs at least one of a protocol conversion of A7 signaling or an A3 connection setup/release between the first and second communication systems.

3. The system according to claim 2, wherein the gateway processor performs an address mapping for an A7 signaling message.

4. The system according to claim 2, wherein the gateway processor is an element of the gateway.

5. The system according to claim 1, wherein a conversion device performs at least one of a conversion between an asynchronous transfer mode and an inter processor communication packet or an asynchronous transfer mode connection/inter processor communication address conversion between the first and second communication systems.

6. The system according to claim 5, wherein, if the handoff is performed from the second mobile communication system to the first mobile communication system, the conversion device performs at least one of a conversion of an AAL5 protocol of an asynchronous transfer mode application layer into an inter processor communication packet, and an address mapping,
   while if the handoff is performed from the first mobile communication system to the second mobile communication system, the conversion device performs at least one of a conversion of inter processor communication packet into an AAL5 protocol of asynchronous transfer mode application layer, and an address mapping.

7. The system according to claim 5, wherein the conversion device is an element of the gateway.

8. The system according to claim 1, wherein an interface device interfaces with a trunk device and communicates with a gateway processor.

9. The system according to claim 8, wherein the interface device is an element of the gateway and the trunk device is an element of the first mobile communication system.

10. The system according to claim 9, wherein an interface conversion device interfaces between the interface device and the second mobile communication system for the protocol conversion.

11. The system of claim 1, wherein a gateway network processor performs communication with a sub device through a local communication channel.

12. The system of claim 1, wherein a gateway network processor performs a mutual exchange of transmission control protocol/internet protocol with an AAL5 of an asynchronous transfer mode application layer.

13. A method for accomplishing a handoff between mobile communication systems using a gateway, the method comprising:
   transmitting a handoff request message from a first mobile communication system to the gateway by performing a message process;
   transmitting the handoff request message from the gateway to a second mobile communication system by performing at least an address mapping and a protocol conversion between the first and second mobile communication systems; and
   assigning, at the second mobile communication system, the message process and a channel, wherein the protocol conversion includes converting packets of a first type to packets of a second type with one of said first or second type of packets corresponding an asynchronous transfer mode (ATM) packet and the other of said first or second type of packets corresponding to an inter processor communication (IPC) packet, wherein the address mapping performed by the gateway includes mapping at least one type of message between the first and second mobile communication systems, and wherein one or more packets of the first type include a data frame transmitted to the gateway from the first mobile communication system, the data frame comprising an inter processor communication header and inter processor communication data, the inter processor communication data including at least a source address, a target address, a source task identifier (ID), and a target task ID.

14. The method according to claim 13, wherein the address mapping and the protocol conversion enable transmission and reception of at least a signaling message and traffic data between the first and second mobile communication systems.

15. The method according to claim 14, further comprising:
transmitting a handoff response message to the gateway;
performing at least one of the address mapping and the protocol conversion; and
transmitting the handoff response message to the first mobile communication system.

16. The method according to claim 14, wherein in order to perform the handoff between the first and second mobile communication systems, a message process to be used by the first and second mobile communication systems is added to the gateway between the first and second mobile communication systems, and then the handoff is performed.

17. A method for accomplishing a handoff between mobile communication systems using a gateway, the method comprising:
transmitting a handoff request message from a first mobile communication system to the gateway by performing a message process;
transmitting the handoff request message from the gateway to a second mobile communication system by performing at least an address mapping and a protocol conversion between the first and second mobile communication systems; and
assigning, at the second mobile communication system, the message process and a channel, wherein said address mapping is performed based on a data frame transmitted to the gateway from the second mobile communication system after going through message processing, wherein the data frame comprises an internet protocol header and an internet protocol data, and the internet protocol data includes at least a source address, a target address, a source task identifier (ID), and a target task ID.

18. A method for accomplishing a handoff between mobile communication systems using a gateway, the method comprising:
transmitting a handoff request message from a first mobile communication system to the gateway by performing a message process;
transmitting the handoff request message from the gateway to a second mobile communication system by performing at least an address mapping and a protocol conversion between the first and second mobile communication systems; and
assigning, at the second mobile communication system, the message process and a channel, wherein said address mapping is performed based on a data frame transmitted to the first mobile communication system from the gateway after going through message processing,
wherein the data frame comprises an inter processor communication header and an inter processor communication data, and the inter processor communication data includes at least a target address, and a target task identifier (ID).

19. A method for accomplishing a handoff between mobile communication systems using a gateway, the method comprising:
transmitting a handoff request message from a first mobile communication system to the gateway by performing a message process;
transmitting the handoff request message from the gateway to a second mobile communication system by performing at least an address mapping and a protocol conversion between the first and second mobile communication systems; and
assigning, at the second mobile communication system, the message process and a channel, wherein the address mapping and the protocol conversion enable transmission and reception of at least a signaling message and traffic data between the first and second mobile communication systems, and
wherein a data frame transmitted to the gateway from the first mobile communication system after going through message processing comprises an inter processor communication header and inter processor communication data, and the inter processor communication data includes at least a source address, a target address, a source task identifier (ID), and a target task ID.

20. The method according to claim 19, wherein an address mapping and routing function are performed with use of target system information and signal ID information.

21. A method for accomplishing a handoff between mobile communication systems using a gateway, the method comprising:
transmitting a handoff request message from a first mobile communication system to the gateway by performing a message process;
transmitting the handoff request message from the gateway to a second mobile communication system by performing at least an address mapping and a protocol conversion between the first and second mobile communication systems; and
assigning, at the second mobile communication system, the message process and a channel, wherein the address mapping and the protocol conversion enable transmission and reception of at least a signaling message and traffic data between the first and second mobile communication systems, and
wherein a data frame transmitted to the second mobile communication system from the gateway after going through message processing comprises at least an internet protocol header and an internet protocol data, and the internet protocol data includes at least a source address, a target address, a source task identifier (ID), and a target task ID.

22. A method for accomplishing a handoff between mobile communication systems using a gateway, the method comprising:
transmitting a handoff request message from a first mobile communication system to the gateway by performing a message process;
transmitting the handoff request message from the gateway to a second mobile communication system by performing at least an address mapping and a protocol conversion between the first and second mobile communication systems; and assigning, at the second mobile communication system, the message process and a channel, wherein the address mapping and the protocol conversion enable transmission and reception of at least a signaling message and traffic data between the first and second mobile communication systems, and wherein a data frame transmitted to the gateway from the second mobile communication system after going through message processing comprises an internet protocol header and internet protocol data, and the internet protocol data includes at least a source address, a target address, a source task identifier (ID), a target task ID.

* * * * *